United States Patent
White

(10) Patent No.: US 7,526,524 B2
(45) Date of Patent: *Apr. 28, 2009

(54) NETWORK CONFERENCING USING METHOD FOR DISTRIBUTED COMPUTING AND/OR DISTRIBUTED OBJECTS

(75) Inventor: Wesley White, Kennesaw, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1012 days.

This patent is subject to a terminal disclaimer.

(21) Appl. No.: 10/853,871

(22) Filed: May 26, 2004

(65) Prior Publication Data

US 2005/0278423 A1   Dec. 15, 2005

(51) Int. Cl.
*G06F 15/16* (2006.01)
(52) U.S. Cl. .................. 709/204; 709/248; 709/227
(58) Field of Classification Search .............. None
See application file for complete search history.

(56) References Cited

U.S. PATENT DOCUMENTS

| | | | |
|---|---|---|---|
| 4,738,407 A | 4/1988 | Dumas | |
| 4,796,293 A | 1/1989 | Blinken et al. | |
| 5,530,472 A | 6/1996 | Bregman et al. | |
| 5,537,548 A | 7/1996 | Fin | |
| 5,659,892 A | 8/1997 | Poggio | |
| 5,701,301 A | 12/1997 | Weisser, Jr. | |
| 5,784,561 A | 7/1998 | Bruno et al. | |
| 5,822,526 A | 10/1998 | Tefoya | |
| 5,838,774 A | 11/1998 | Weisser, Jr. | |
| 5,854,893 A | 12/1998 | Ludwig | |
| 5,884,032 A | 3/1999 | Bateman et al. | |
| 5,978,463 A | 11/1999 | Jurkevics et al. | |
| 5,978,806 A | 11/1999 | Lund | |
| 5,995,608 A | 11/1999 | Detampel, Jr. et al. | |
| 5,999,966 A | 12/1999 | McDougall et al. | |
| 6,049,602 A | 4/2000 | Foladare et al. | |
| 6,064,730 A | 5/2000 | Ginsberg | |
| 6,148,088 A | 11/2000 | Lowery | |
| 6,181,786 B1 | 1/2001 | Detampel, Jr. et al. | |
| 6,233,605 B1 | 5/2001 | Watson | |
| 6,446,113 B1 | 9/2002 | Ozzie | |
| 6,560,637 B1 | 5/2003 | Dunlap | |
| 6,714,635 B1 | 3/2004 | Adams et al. | |
| 6,791,974 B1 | 9/2004 | Greenberg | |
| 7,328,243 B2* | 2/2008 | Yeager et al. | 709/205 |
| 7,353,252 B1* | 4/2008 | Yang et al. | 709/204 |
| 2002/0188878 A1 | 12/2002 | Edecker | |
| 2003/0093476 A1 | 5/2003 | Syed | |

* cited by examiner

*Primary Examiner*—John B. Walsh
(74) *Attorney, Agent, or Firm*—Scott P. Zimmerman, PLLC

(57) ABSTRACT

Methods, systems, and products are disclosed for conducting a peer to peer conference amongst remote participants. During the conference, a synchronization command is communicated from a host communications device to an upstream participant device and communicated to a downstream participant device. The synchronization command provides an instruction to present an object from a library of stored objects. An acknowledgment is then communicated to the host communications device. The synchronization acknowledgment confirms a successful presentation of the object.

20 Claims, 11 Drawing Sheets

NETWORK CONFERENCING USING METHOD FOR DISTRIBUTED COMPUTING AND/OR DISTRIBUTED OBJECTS

CROSS REFERENCE TO RELATED APPLICATIONS

This application relates to U.S. patent application Ser. No. 10/831,517, entitled "Methods, Systems, and Products for Network Conferencing," filed Apr. 23, 2004, and of which the "Brief Summary of the Invention" and "Detailed Description of the Invention" sections are incorporated herein by this reference.

This application relates to U.S. patent application Ser. No. 10/854,055, entitled "Network Conferencing Using Method for Concurrent Real Time Broadcast and Distribution Computing And/Or Distributed Computing And Distributed Objects," filed May 26, 2004, and of which the "Brief Summary of the Invention" and "Detailed Description of the Invention" sections are incorporated herein by this reference.

This application relates to U.S. patent application Ser. No. 10/853,872, entitled "Network Conferencing Using Method For Distributed Computing And/Or Distributed Objects To intermediate Host For Presentation To a Communications Device," filed May 26, 2004, and now issued as U.S. Pat . No. 7,403,696, of which the "Brief Summary of the Invention" and "Detailed Description of the Invention" sections are incorporated herein by this reference.

This application relates to U.S. patent application Ser. No. 10/854,324, entitled "Network Conferencing Using Method For Distributed Computing And/Or Distributed Objects For Presentation To A Mobile Communications Device," filed May 26, 2004, and of which the "Brief Summary of the Invention" and "Detailed Description of the Invention" sections are incorporated herein by this reference.

This application relates to U.S. patent application Ser. No. 10/854,452, entitled "Methods, Systems, and Products for Network Conferencing," filed May 26, 2004, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to conferencing over telecommunications and/or data networks and, more particularly, to peer-to-peer computer data transfer for conferencing and for synchronizing.

2. Description of the Related Art

Bandwidth is a problem when conferencing. Video and/or desktop conferencing, such as training sessions and other distributed presentations, often requires real-time streaming of the presentation materials. If the remote participants are few in number, and if the file size of the presentation materials is manageable, then real-time data streaming may provide an adequate quality of presentation. If, however, there are a large number of remote participants or the file size of the materials is quite large, then real-time streaming poses problems. As the number of remote participants increases and/or as the file size of the presentation materials increases, the required bandwidth also increases. Fifty (50) remote participants, for example, require fifty (50) real-time data streams fanning out from the host computer. As the number of remote participants increases, the host computer is also taxed to manage communications with all the remote computers. All the participants to the conference, then, eventually suffer from network congestion and from degradation in processor performance. The quality of the conference is reduced, and all the participants to the conference have a less-than-desirable experience. There is, accordingly, a need in the art for methods, systems, and products for improved conferencing among remote participants. There is also a need for reducing the bandwidth required when conferencing that does not rely upon real-time streaming.

BRIEF SUMMARY OF THE INVENTION

The aforementioned problems, and other problems, are reduced by this invention. This invention comprises methods, computer systems, computer programs, and computer program products that improve conferencing among remote participants. This invention also leverages peer to peer communications connections of participant communications devices. This invention does not require real-time streaming of presentation materials, so less bandwidth is required. This invention also includes features that help ensure all P2P participants (i.e., upstream participants communicating with the host and/or server as well as downstream participants communicating either with the upstream participant or with another downstream participant) are synchronized to the host's presentation. As the conference host progresses through the presentation, this invention identifies to the host which participants have viewed a current object (also referred to as the "synchronized object") of the presentation as well as which participants are lagging behind and/or jumping ahead in the presentation materials. This invention can even prevent the host from advancing in the presentation materials until all P2P participants have viewed/heard/loaded the current object of the presentation. Furthermore, this invention includes additional features for a participant and/or the host to control exiting the conference, delaying presentment of the conference to a particular participant, providing unrestricted access to the entire presentation, providing authority to distribute presentation materials to a non-participant of the conference, modifications to the presentation. This invention, then, allows the host to have greater knowledge of communications connections among the participant communications devices and of the audience's participation, thus allowing the host to better leverage communication assets and to tailor the conference to better suit the participants.

This invention discloses methods, systems, and products for conducting a conference amongst remote peer to peer (also referred to as "P2P") participants. One of the embodiments describes a method for synchronizing presentation objects to conferencing peer to peer participants. Initially, at least one upstream participant communications device and at least one downstream participant communications device are determined. The upstream participant communications device is identified as a participant communications device in communication with a host communications device and/or a host server and in communication with a downstream participant communications device. The downstream participant communications device is identified as a participant communications device in communication with the upstream participant communications device and/or in communication with another participant communications device that is not in communication with the host communications device and/or server device. Prior to the conference, a library of digital objects is communicated to the upstream participant communications device, and the upstream participant communications device communicates the library of digital objects to the downstream participant communications device. Then, during the conference, a synchronization command is communicated from the host communications device and/or the server device to the upstream participant's communications device, and then, the upstream participant communications device communicates the synchronization command to the downstream participant communications device. The synchronization command instructs the participant communications devices (including both upstream and downstream participant communications devices) to present an object from the library of digital objects. A synchronization acknowledgment is then received from the upstream participant's communications device, and the synchronization acknowledgment identifies the upstream and downstream participant communications devices and confirms a successful presentation of the object on the participant communications devices.

Other embodiments of this invention describe a system for conducting and/or managing a conference amongst remote peer to peer (also referred to as "P2P") participants. The system comprises a Peer to Peer Conferencing Module stored in a memory device, and a processor communicating with the memory device. The Peer to Peer Conferencing Module initializes upstream and downstream participant communications devices and communicates a library of digital objects to an upstream participant communications device prior to a conference. The library of digital objects is communicated to the upstream participant communications device via a communications network, such as, for example, a telecommunications network (e.g., Public Switched Telephone Network (PSTN)), a data communications network (e.g., an Internet Protocol communications network), and/or a satellite network. Thereafter, the upstream participant communications device communicates the library of digital objects to the downstream participant communications device, and the downstream communications device may communicate the library of digital objects to another downstream participant communications device. During the conference a synchronization command communicates from the host communications device to the upstream participant communications device. The synchronization command instructs the upstream participant communications device to present a selected object from the library of digital objects and instructs the upstream participant communications device to communicate the synchronization command to the downstream participant communications device. Then, the synchronization command communicated to the downstream participant communications device instructs the downstream participant communications device to present the object, and, if there is an additional downstream participant communications device, to communicate the synchronization command to the other downstream participant communications device. After the selected object is presented to the participant communications devices, a synchronization acknowledgment is communicated from the upstream participant communications device to the host, and the synchronization acknowledgment confirms a successful presentation of the object on the participant communications devices.

Other embodiments of this invention describe a computer program product. A computer-readable medium stores a Peer to Peer Conferencing Module. The Peer to Peer Conferencing Module initializes upstream and downstream participant communications devices and communicates a library of digital objects to an upstream participant communications device prior to a conference. The library of digital objects is communicated to the upstream participant communications device via a communications network, such as, for example, a telecommunications network (e.g., Public Switched Telephone Network (PSTN)), a data communications network (e.g., an Internet Protocol communications network), and/or a satellite network. Thereafter, the upstream participant communications device communicates the library of digital objects to the downstream participant communications device, and the downstream communications device may communicate the library of digital objects to another downstream participant communications device. During the conference a synchronization command communicates from the host communications device to the upstream participant communications device. The synchronization command instructs the upstream participant communications device to present a selected object from the library of digital objects and instructs the upstream participant communications device to communicate the synchronization command to the downstream participant communications device. Then, the synchronization command communicated to the downstream participant communications device instructs the downstream participant communications device to present the object, and, if there is an additional downstream participant communications device, to communicate the synchronization command to the other downstream participant communications device. After the selected object is presented to the participant communications devices, a synchronization acknowledgment is communicated from the upstream participant communications device to the host, and the synchronization acknowledgment confirms a successful presentation of the object on the participant communications devices.

Other systems, methods, and/or computer program products according to embodiments will be or become apparent to one with skill in the art upon review of the following drawings and detailed description. It is intended that all such additional systems, methods, and/or computer program products be included within this description, be within the scope of this invention, and be protected by the accompanying claims.

BRIEF DESCRIPTION OF THE SEVERAL VIEWS OF THE DRAWINGS

These and other features, aspects, and advantages of the embodiments of this invention are better understood when the following Detailed Description of the Invention is read with reference to the accompanying drawings, wherein.

DETAILED DESCRIPTION OF THE INVENTION

Figure 1:
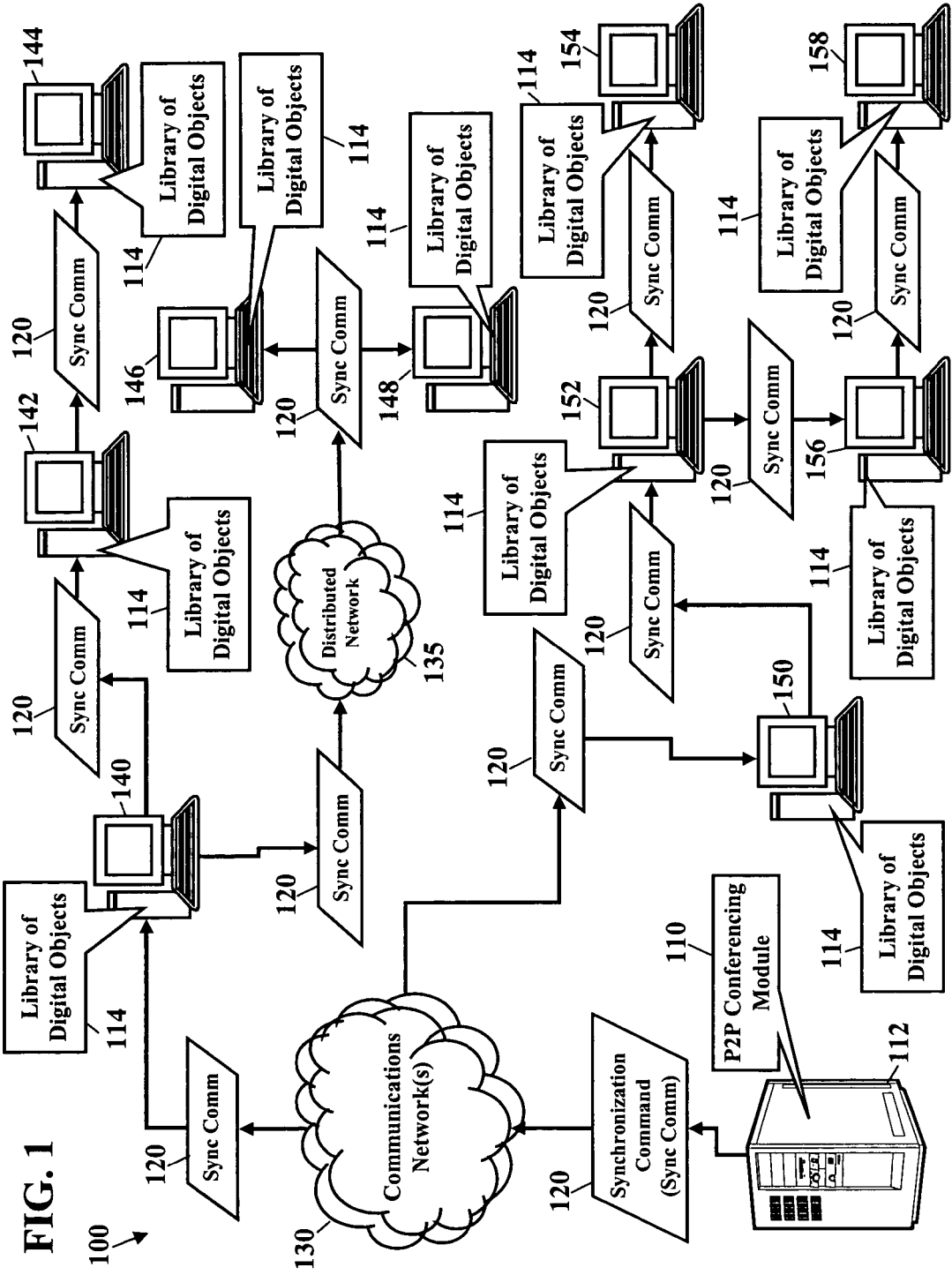
FIGS. 1-2 are schematics illustrating a peer to peer network for conferencing, synchronization, and management according to some of the exemplary embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention improves conferencing among peer to peer ("P2P") participants. This invention does not require real-time streaming of presentation materials, so less bandwidth is required. This invention also includes features that help ensure all P2P participants (i.e., upstream participants communicating with the host and/or server as well as downstream participants communicating either with the upstream participant or with another downstream participant) are synchronized to the host's presentation. As the conference host progresses through the presentation, this invention identifies to the host which participants have viewed a current object (also referred to as the "synchronized object") of the presentation as well as which participants are lagging behind and/or jumping ahead in the presentation materials. This invention can even prevent the host from advancing in the presentation materials until all P2P participants have viewed/heard/loaded the current object of the presentation. Furthermore, this invention includes additional features for a participant and/or the host to control exiting the conference, delaying presentment of the conference to a particular participant, providing unrestricted access to the entire presentation, providing authority to distribute presentation materials to a non-participant of the conference, and to control modifications to the presentation. This invention, then, allows the host to have greater knowledge of communications connections among the participant communications devices and of the audience's participation, thus allowing the host to better leverage communication assets and to tailor the conference to better suit the participants.

FIG. 1 is a schematic of a peer to peer network 100 illustrating some of the embodiments this invention. These embodiments include methods, systems, computer programs, and/or computer program products that manage a conferencing session amongst peer to peer participant communications devices. A host-resident Peer to Peer ("P2P") Conferencing Module 110 manages the conferencing session with the peer to peer participant communications devices including at least one upstream participant communications device 140, 150 and at least one downstream participant downstream communications devices 142, 144, 146, 148, 152, 154, 156, and 158. Although the P2P Conferencing Module 110 operates within any communications device, FIG. 1 shows the P2P Conferencing Module 110 operating within a host computer shown as a server 112. Prior to a scheduled date and time for the conference, a library 114 of digital objects is communicated to the peer to peer participant communications devices. According to embodiments of this invention, the library 114 of digital objects may be communicated from the server 112 to the upstream participant communications devices 140, 150 via a communications network 130, such as, for example, a telecommunications network (e.g., Public Switched Telephone Network (PSTN), Mobile Switching Telephone Office (MSTO), and others), a data network (e.g., an Internet (sometimes alternatively known as the "World Wide Web"), an intranet, a local-area network (LAN), and/or a wide-area network (WAN)), and/or a satellite network. And then, the upstream participant communications devices 140, 150, may communicate the library 114 to an associated downstream participant communications device as described further below. Alternatively, the library 114 of digital objects may be communicated/distributed via physical media, such as a CDROM, memory card, disk, and/or other memory storage device according to other embodiments of this invention. The library 114 of digital objects can be any audible and/or visual presentation materials. The library 114 of digital objects, for example, may include slides (such as MICROSOFT® POWERPOINT® file(s)), pictures, documents, audio, video, and/or any other computer file that can be stored on and/or presented to the participants communications devices 140, 142, 144, 146, 148, 150, 152, 154, 156, and 158 (MICROSOFT® and POWERPOINT® are registered trademarks of Microsoft Corporation, One Microsoft Way, Redmond Wash. 98052-6399, (425) 882-8080).

This invention reduces bandwidth requirements. Because the library 114 of digital objects is transferred prior to the scheduled conference, this invention eliminates the often-cumbersome real-time distribution of presentation materials. This invention, instead, sends the presentation materials ahead of the scheduled date and time of the conference. Each participant communications device 140, 142, 144, 146, 148, 150, 152, 154, 156, and 158, then, locally stores the presentation materials. High bandwidth, therefore, is not required to participate in the conference.

This invention also leverages the communication assets of the peer to peer network 100 including communications paths between and/or among server and participant communications devices and between and/or among assets of each participant communications device. Prior to communicating the library of digital objects, the host computer (e.g., server 112 of FIG. 1) transmits an initialization command to identify communication connections, if any, between at least two participant communications devices (e.g., participant communications devices 140, 142, 144, 146, 148, 150, 152, 154, 156, and/or 158 of FIG. 1) and to analyze transmission rates between the connected participant communications devices and between the host communications device and each of the participant communications devices to determine a list of one or more upstream participant communications devices (e.g., upstream participant communications devices 140, 150 of FIG. 1) and one or more downstream participant communications devices (e.g., downstream participant communications devices 142, 144, 146, 148, 152, 154, 156, and 158 of FIG. 1). Alternatively, the list may be created by an administrator, a user, (e.g., a host user or a participant user), by communications costs associated with each of the available communications paths connecting P2P participant communications devices, and/or by other decision factors (e.g., reliability, security, ease of access, and so on). Regardless of how the list is determined, the host computer accesses the list for communication instructions from the host computer (e.g., server 112 of FIG. 1) to each of the upstream participant communications devices (e.g., upstream participant communications devices 140, 150 of FIG. 1), for communication instructions for each of the upstream participant communications devices to the downstream communications devices (e.g., upstream participant communications device 140 communicates with downstream participant communications devices 142, 146, and 148), and for communications instructions for each of the downstream participant communications devices to other downstream participant communications devices (e.g., downstream participant communications device 142 communicates with another downstream participant communications device 144). The host computer communicates the list to the upstream participants communications device(s), and, if requested, to the downstream participant communications devices. However, the upstream participant communications device(s) typically communicate the list to the connected downstream participant communications devices, and the downstream participant communications devices communicate the list to other downstream participant communications devices similar to how the library 114 of digital objects is communicated. After the library 114 is communicated from the host computer to the upstream participant communications device, the host computer may also use the list to request verification from the upstream participant communications device (and, if desired, from the downstream participant communications device) that the library of digital objects is stored locally to each participant communications device. An exemplary list of the peer to peer network 100 communications paths is illustrated below in Table 1.

The peer to peer network 100 may communicate a message from the host computer to an upstream participant communications device, then from the upstream participant communications device to the downstream participant communications device, and then from the downstream participants communications device to another downstream participant communications device. For example, the library 114 may be communicated from the server 112 to each upstream participant communications device 140, 150. Each of the upstream participant communications device 140, 150 then communicates the library 114 of digital objects to one or more associated downstream participant communications devices 142, 146, 148, 152, 154, 156, and 158, and each of these downstream participant communications devices 142 connected to other downstream participant communications devices 144, then communicates the library 114 to the other downstream participant communications device 144. As shown in FIG. 1, upstream participant communications device 140 communicates the library 114 to downstream participant communications device 142 via a direct/networked wired connection to downstream participant communications device 142 and simultaneously communicates to downstream participant communications devices 146 and 148 via a distributed network 135. Thereafter, downstream participant communications device 142 communicates the library 114 via a direct/networked connection to downstream participant communications device 144. Similarly, upstream participant communications device 150 communicates the library 114 via a direct/networked wired connection to downstream participant communications device 152. Thereafter, the downstream participant communications device 152 simultaneously communicates the library 114 to downstream participant communications devices 154 and 156. And then, the downstream participant communications device 156 communicates the library via a wired/network connection to another downstream participant communications device 158.

During the conference, synchronization commands are issued via the peer to peer network 100. As the conference progresses, the P2P Conferencing Module 110 communicates a synchronization command (also referred to as "Sync Confirm") 120 from the server 112 to each upstream participant communications device 140, 150, then each upstream participant communications device 140, 150 communicates the synchronization command 120 to one or more associated downstream participant communications devices 142, 146, 148, 152, 154, 156, and 158, and each of these downstream participant communications devices 142 communicate the synchronization command 120 to other associated downstream participant communications devices 144. The syn-

TABLE 1

Peer to Peer Network Communications Paths of FIG. 1

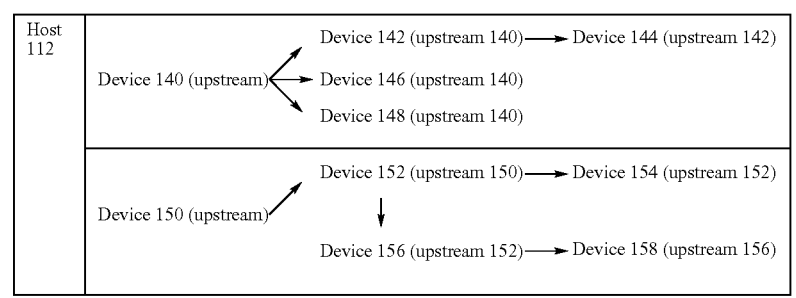

chronization command 120 commands/instructs a receiving participant communications device (1) to communicate the synchronization command 120 within the peer to peer network (e.g., upstream participant communications device 140 communicates the synchronization command 120 to downstream participant communications devices 142, 146, and 148, and downstream participant communications device 142 communicates the synchronization command 120 to connected downstream participant communications device 144) and (2) to visually and/or audibly present the synchronized object from the library 114 of digital objects to the receiving participant communications device. That is, as the server 112 switches from one synchronized object to another synchronized object in the library 114 of digital objects, each synchronization command 120 is communicated within the peer to peer network 100 to instruct the peer to peer participant communications devices 140, 142, 144, 146, 148, 150, 152, 154, 156, and 158 to "follow along" and synchronize with the server 112.

Figure 2:
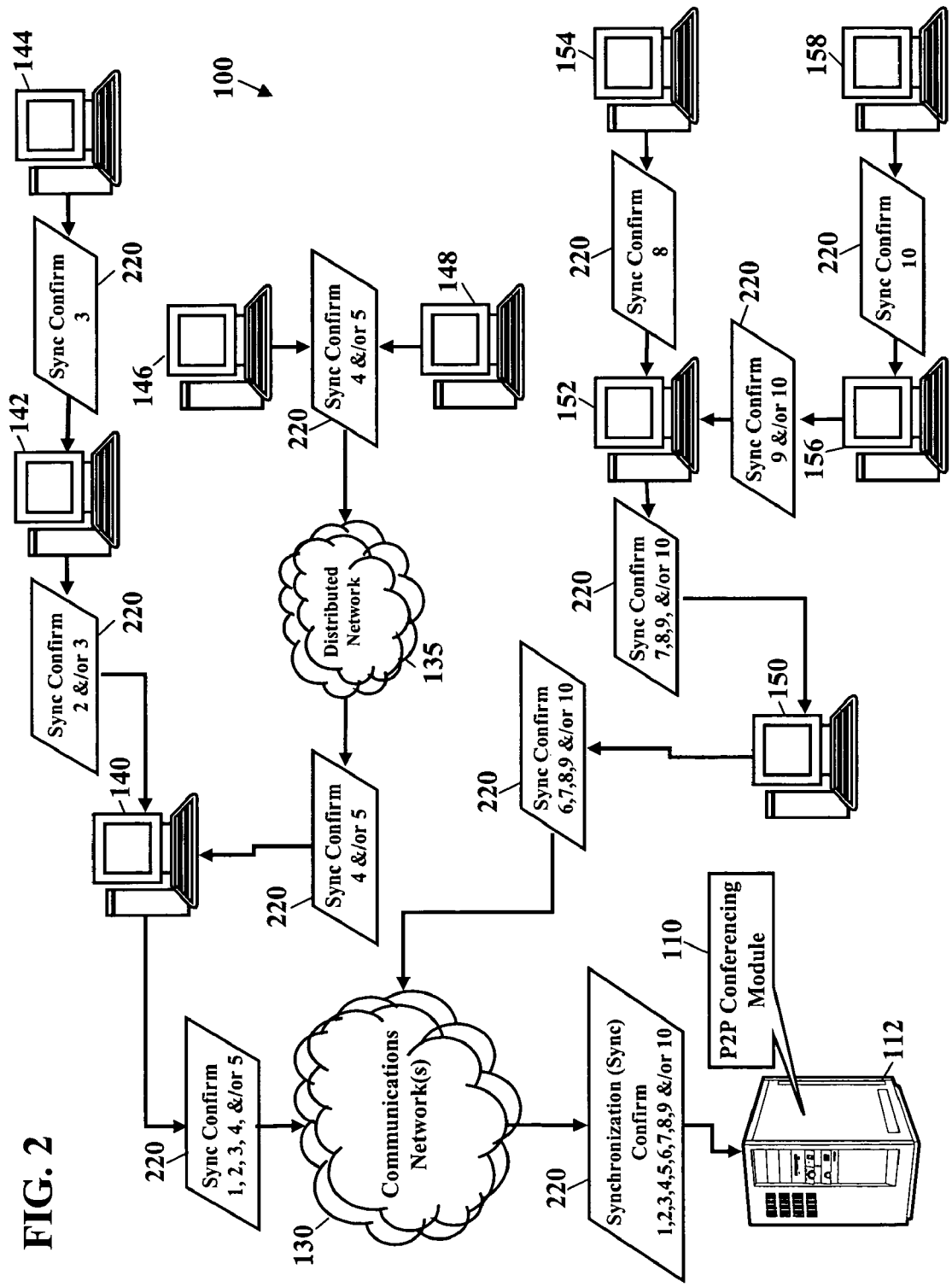

FIG. 2 is a schematic illustrating some more of the embodiments of this invention. After the synchronization command (shown as reference numeral 120 in FIG. 1) is communicated within the peer to peer network 100, the peer to peer participant communications device 140, 142, 144, 146, 148, 150, 152, 154, 156, and 158 may also acknowledge synchronization. When the furthest downstream participant communications device (e.g., downstream participant communications device 144 or downstream participant communications device 158) successfully presents the synchronized object (i.e., synchronized from the Sync Comm 120 of FIG. 1) from the library 114, then that downstream participant communications device communicates a synchronization confirmation (also referred to as "Sync Confirm") 220 up the peer to peer network of P2P participant communications devices so that the upstream participant communications devices 140, 150 may then communicate the synchronization confirmation 220 back to the server 112 (and to the host). An exemplary list for the synchronization confirmation 220 communications paths of the peer to peer network 100 is shown below in Table 2.

device as well as acknowledge the successful presentation of the synchronized object to other P2P participant communications devices sharing the same communications path(s). For example, the synchronization confirmation 220 from upstream participant communications device 150 may acknowledge successful presentation of the synchronized object to P2P communications device 150, 152, 156, and 158 as well as report a failed presentation of the synchronized object to P2P communications device 154.

The synchronization confirmation 220 provides several advantages. The synchronization confirmation 220 may help to ensure and/or to provide helpful information that all P2P participants are synchronized before the host advances to the next object in the library 114 of digital objects. The P2P Conferencing Module 110, for example, may use the synchronization confirmation 220 to force the server 112, and thus the host, to delay communication of any subsequent synchronization commands 120. The host then may choose to wait until each P2P participant communications device return communicates the synchronization confirmation 220. For example, the host may choose to not jump to another object in the library 114 until all P2P participant communications devices 140, 142, 144, 146, 148, 150, 152, 154, 156, 158 have successfully presented the synchronized object. The P2P Conferencing Module 110 can even visually and/or audibly inform the host of the P2P participant communications devices that are synchronized and of which participants are not synchronized.

In further exemplary embodiments, the synchronization confirmation 220 may include additional information, such as a request from one (or more) of the P2P participant communications devices 140, 142, 144, 146, 148, 150, 152, 154, 156, 158, to the server 112, and thus to the host. For example, downstream participant communications device 148 may communicate the synchronization confirmation 220 with a request to exit the conference. This request is communicated with the synchronization confirmation 220 to upstream communications device 140 and then to server 112 such that the host may identify that downstream participant communica-

TABLE 2

Peer to Peer Network Communications Paths of FIG. 2

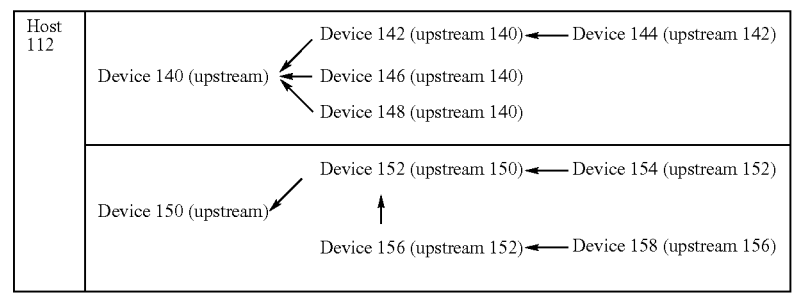

The upstream participant communications devices 140, 150 communicate the synchronization confirmation 220 via the communications network 130 to the server 112. The synchronization confirmation 220 acknowledges the successful presentation of the synchronized object on each of the P2P participant communications devices 140, 142, 144, 146, 148, 150, 152, 154, 156, 158. Alternatively, the synchronization confirmation 220 may also report a failed presentation of the synchronized object to a P2P participant communications tions device 148 requests to exit the conference. When the server communicates the next synchronized command (shown as reference numeral 120 of FIG. 1), that subsequent synchronization command 120 may include commands and/or instructions that enable the downstream communications device 148 to exit the conference and that terminate subsequent synchronization commands 120 to downstream communications device 148. Furthermore, if subsequent synchronization commands 120 are terminated to a P2P downstream participant communications device that provides a communications path to other P2P downstream participant communications devices (e.g., upstream participant communications device 140 provides a communications path to downstream participant communications device 142 that provides a communications path to downstream communications device 144), then the peer to peer network may need to be reconfigured so that an alternate communications path is available to participating downstream participant communications devices. For example, if subsequent synchronization commands 120 were terminated to downstream participant communications device 142, then the communications path of upstream participant communications device 140 may need to be updated to provide a communications path to downstream communications device 144 so that downstream communications device 144 receives subsequent synchronization commands 120 (since downstream participant communications device 142 is no longer participating in the conference and subsequent synchronization commands 120 from downstream participant communications device 142 are terminated).

In further exemplary embodiment, the synchronization confirmation 220 may include other requests from a P2P participant including a request to delay presentment of the synchronized object, a request to access to a non-synchronized digital object, a request for authority to distribute the object to a non-participant of the conference, a request for authority to modify the object, and a request to terminate further communication of the synchronization confirmation. In response to the synchronization confirmation, a subsequent synchronization command 120 may provide commands and/or instructions that enable the request of the P2P participant, such as commands and/or instructions to delay presentment of the synchronized object, to access to any object from the library of digital objects, to distribute the object to the non-participant, to modify the object, and/or to terminate further communication of the synchronization confirmation 220.

According to some of the embodiments, the P2P Conferencing Module 110 can also ignore the synchronization confirmation 220. The synchronization confirmation 220, as explained above, provides a tool that may help ensure that all P2P participants are synchronized before the host advances to the next object in the library 114 of digital objects. The P2P Conferencing Module 110, however, can be configured (prior to or during the conference) to ignore receipt of one or more synchronization acknowledgments 32. That is, the P2P Conferencing Module 110 may allow the host computer, and thus the host, to advance to a subsequent object in the library 114 without first receiving the synchronization confirmation 220 from one or more selected P2P participant communications devices. This feature may also allow the selected P2P participant(s) to "jump" ahead, or lag behind, and view/hear any object from the library 114 of digital objects. For example, the host might determine that some participants need not be synchronized. If, for example, the conference is a training session, some portions of the training session might already be known to some P2P participants, so these P2P participants are selected and are not required to synchronize. Other criteria for selecting a P2P participant may be to select a downstream participant communications device with an unreliable and/or slow communications path. However the P2P participants are selected, the P2P Conferencing Module 110 can be configured to ignore receipt of the synchronization confirmation 220 from these selected P2P participants. Thus, the P2P Conferencing Module 110 may be configured to permit the host computer to advance/return to any object in the library 114 without first receiving the synchronization confirmation 220 from the selected participant communications device.

Figure 3:
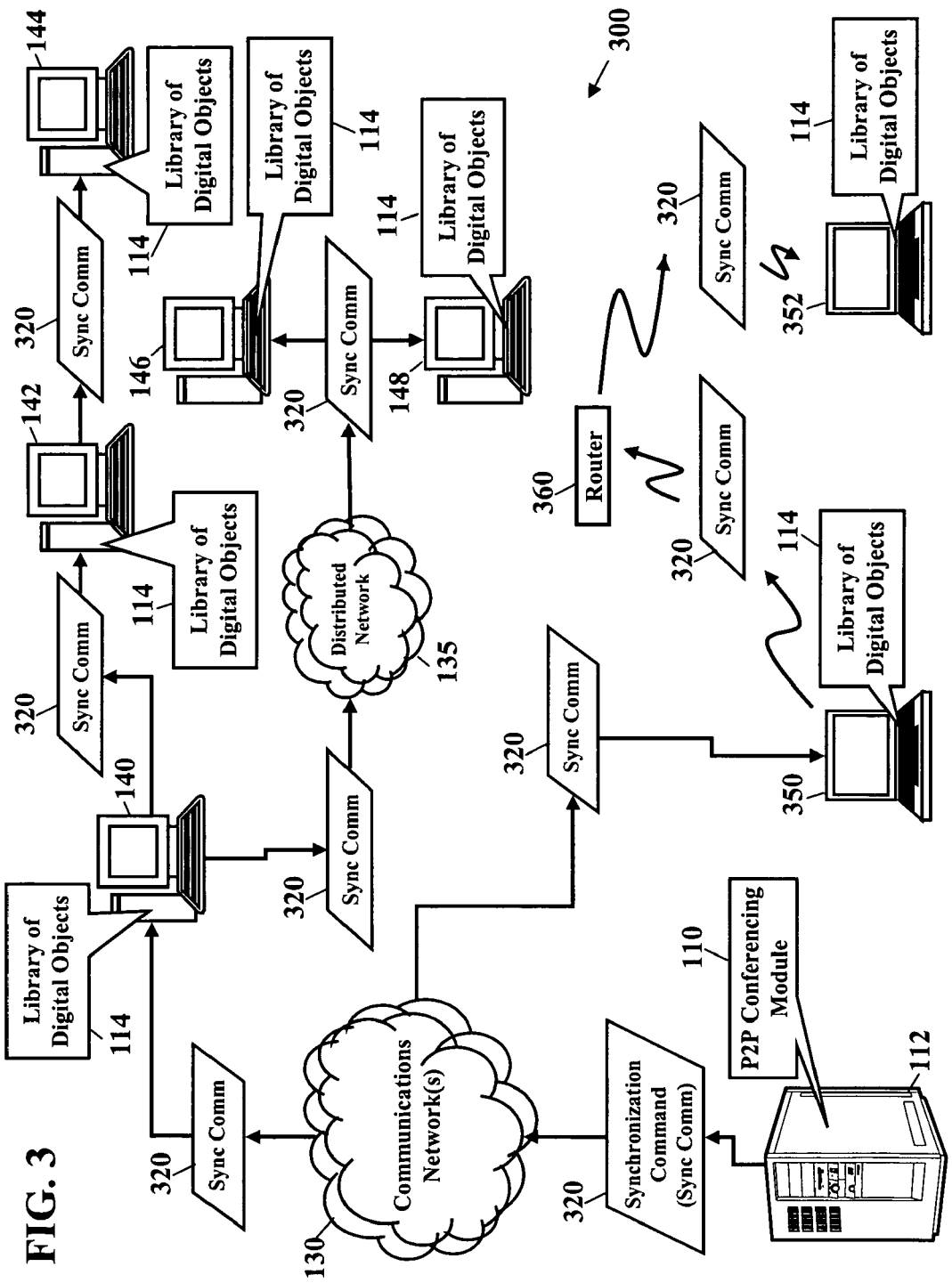
FIGS. 3-4 are schematics illustrating another peer to peer network for conferencing, synchronization, and management according to some of the exemplary embodiments of this invention.
Figure 4:
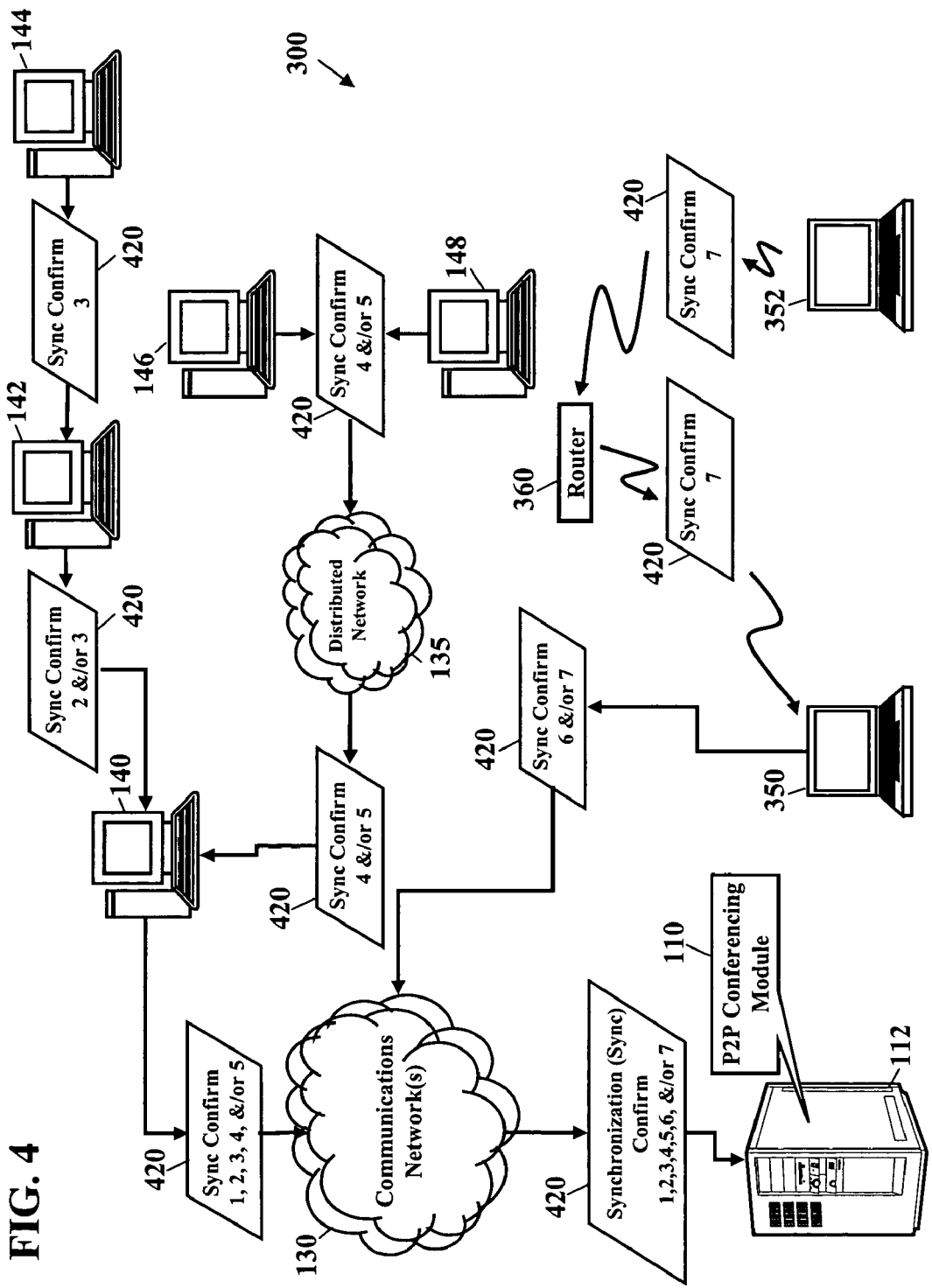

FIGS. 3 and 4 illustrate a peer to peer network 300 similar to the peer to peer network 100 of FIG. 1; however, the peer to peer network 300 includes an upstream participant communications device 350 in communication with a wireless downstream participant communications device 352 via a router 360. The host-resident Peer to Peer ("P2P") Conferencing Module 110 manages the conferencing session with all P2P participant communications devices including upstream participant communications device 140, 350 and with downstream participant communications devices 142, 144, 146, 148, and 352. Similar to the above described embodiments, the library 114 of digital objects is communicated to the peer to peer network 300. That is, the library 114 of digital objects is communicated from the server 112 to the upstream participant communications devices 140, 350 via the communications network 130, and then, the upstream participant communications devices 140, 350 communicates the library 114 to an associated downstream participant communications device as described further below. Each participant communications device then, locally stores the presentation materials. After the library 114 is communicated to the P2P participant communications devices, the peer to peer network 300 may be initialized so that a list of upstream and downstream participant communications devices are determined. An exemplary list of the peer to peer network 300 communications paths of FIG. 3 is illustrated below in Table 3.

TABLE 3

Peer to Peer Network Communications Paths of FIG. 3

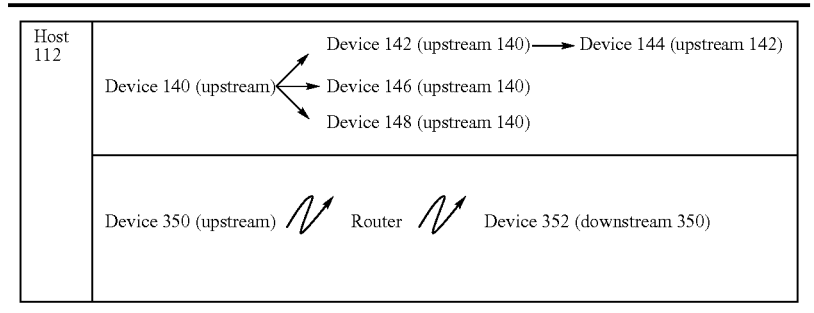

During the conference, synchronization commands are issued via the peer to peer network 300. As the conference progresses, the P2P Conferencing Module 110 communicates a synchronization command 320 (similar to synchronization command 120) from the server 112 to each upstream participant communications device 140, 350, from each upstream participant communications device 140, 350 to one or more associated downstream participant communications devices 142, 146, 148, and 352. The synchronization command 320 commands/instructs a receiving participant communications device (1) to communicate the synchronization command 120 within the peer to peer network 300 (e.g., upstream participant communications device 350 communicates the synchronization command 320 to downstream wireless participant communications devices 352 via router 360) and (2) to visually and/or audibly present the synchronized object from the library 114 of digital objects to the receiving participant communications device.

After the synchronization command (shown as reference numeral 320 in FIG. 1) is communicated within the peer to peer network 300, the peer to peer participant communications device 140, 142, 144, 146, 148, 350, and 352 may also acknowledge synchronization. When the furthest downstream participant communications device (e.g., downstream participant communications device 144 or downstream wireless participant communications device 352) successfully presents the synchronized object (i.e., synchronized from the Sync Comm 320 of FIG. 3) from the library 114, then that downstream participant communications device communicates a synchronization confirmation (also referred to as "Sync Confirm") 420 up the peer to peer network 300 of P2P participant communications devices so that the upstream participant communications devices 140, 350 may then communicate the synchronization confirmation 420 back to the server 112 (and to the host). An exemplary list for the synchronization confirmation 420 communications paths of the peer to peer network 300 is shown below in Table 4.

P2P Conferencing Module 110, for example, is shown residing in a memory subsystem 542. The P2P Conferencing Module 110, however, could also reside in flash memory 544 or a peripheral storage device 546. The computer system 500 also has one or more central processors 548 executing an operating system. The operating system, as is well known, has a set of instructions that control the internal functions of the computer system 500. A system bus 550 communicates signals, such as data signals, control signals, and address signals, between the central processor 548 and a system controller 552 (typically called a "Northbridge"). According to some of the embodiments of this invention, these signals include synchronization commands and synchronization confirmations shown as reference numerals 120, 220, 320, 420, 620, 720, 920, and 1020 of respective FIGS. 1-4, 6-7, and 9-10. The system controller 552 provides a bridging function between the one or more central processors 548, a graphics subsystem 554, the memory subsystem 542, and a PCI (Peripheral Controller Interface) bus 556. The PCI bus 556 is controlled by a Peripheral Bus Controller 558. The Peripheral Bus Controller 558 (typically called a "Southbridge") is an integrated circuit that serves as an input/output hub for various peripheral ports. These peripheral ports are shown including a keyboard port 560, a mouse port 562, a serial port 564 and/or a parallel port 566 for a video display unit, one or more external device ports 568, and networking ports 570 (such as SCSI or Ethernet). The Peripheral Bus Controller 558 also includes an audio subsystem 572. Those of ordinary skill in the art understand that the program, processes, methods, and systems described in this patent are not limited to any particular computer system or computer hardware. Other architectures are possible, and the P2P Conferencing Module 110 can operate in any architecture.

Those of ordinary skill in the art also understand the central processor 548 is typically a microprocessor. Advanced Micro

TABLE 4

Peer to Peer Network Communications Paths of FIG. 4

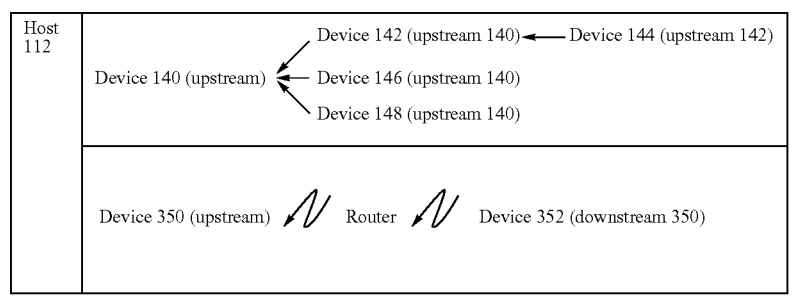

Similar to the above described embodiments, the synchronization confirmation 420 acknowledges the successful presentation (or a failed presentation or a request) of the synchronized object on each of the P2P participant communications devices 140, 142, 144, 146, 148, 350, and 352.

Figure 5:
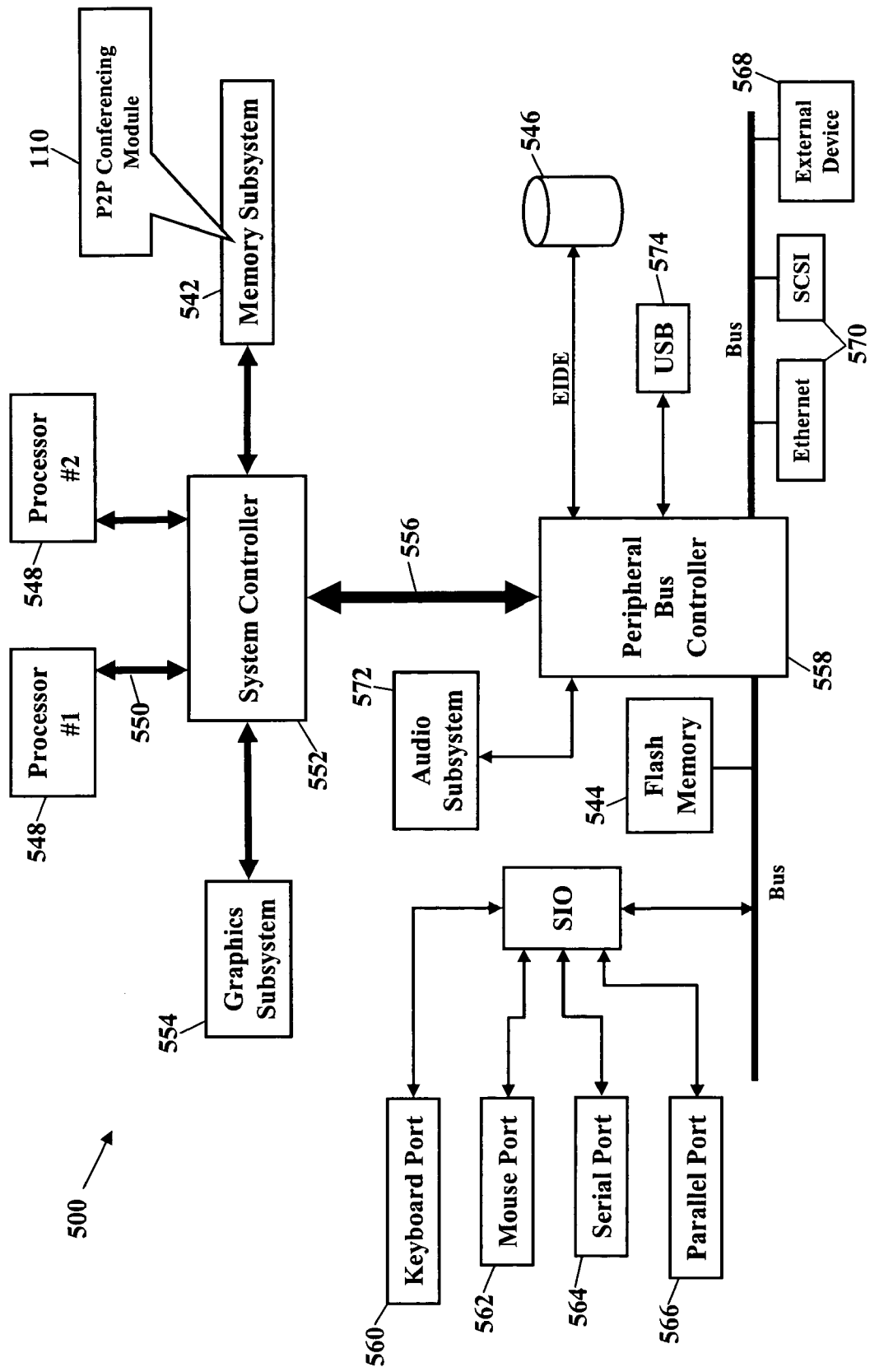
FIG. 5 illustrates a block diagram of an operating system according to some of the exemplary embodiments of this invention.

FIG. 5 illustrates a block diagram showing the P2P Conferencing Module 110 residing in a computer system 500. The computer system 500 may be any computing system, such as the server (shown as reference numeral 112 in FIGS. 1-4), a laptop/desktop computer, a tablet computer, and/or other computer systems including wired and wireless communications devices. As FIG. 5 shows, the P2P Conferencing Module 110 operates within a system memory device. The Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), Sun Microsystems, Inc. (4150 Network Circle, Santa Clara Calif. 95054, www.sun.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 542, flash memory 544, or peripheral storage device 546) may also contain an application program. The application program cooperates with the operating system and with a video display unit (via the serial port 564 and/or the parallel port 566) to provide a Graphical User Interface (GUI). The Graphical User Interface typically includes a combination of signals communicated along the keyboard port 560 and the mouse port 562. The Graphical User Interface provides a convenient visual and/or audible interface of the P2P Conferencing Module 110 with a user of the computer system 500.

Figure 6:
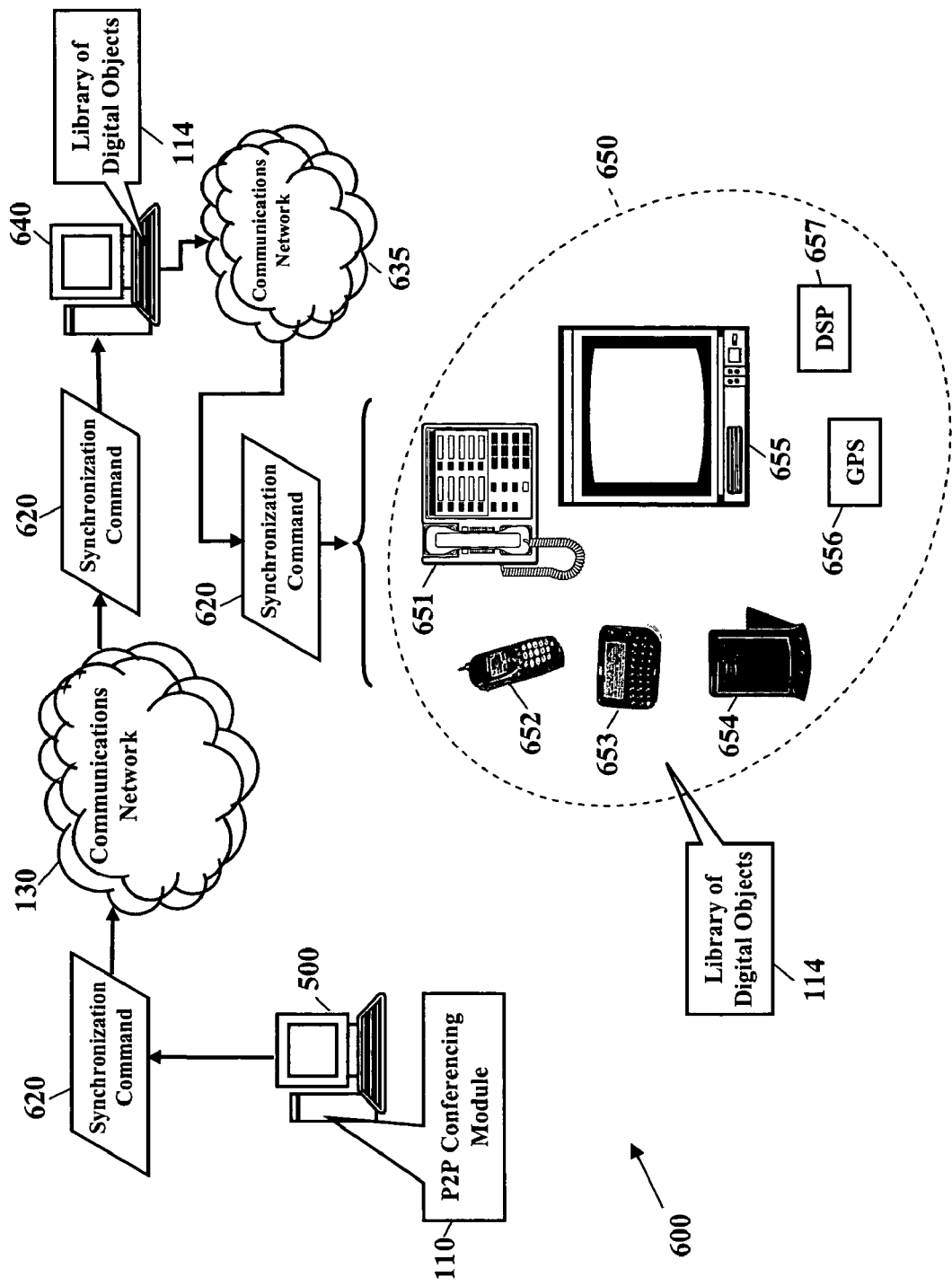
FIGS. 6-7 are schematics depicting a further peer to peer network for conferencing, synchronization, and management according to some of the exemplary embodiments of this invention.
Figure 7:
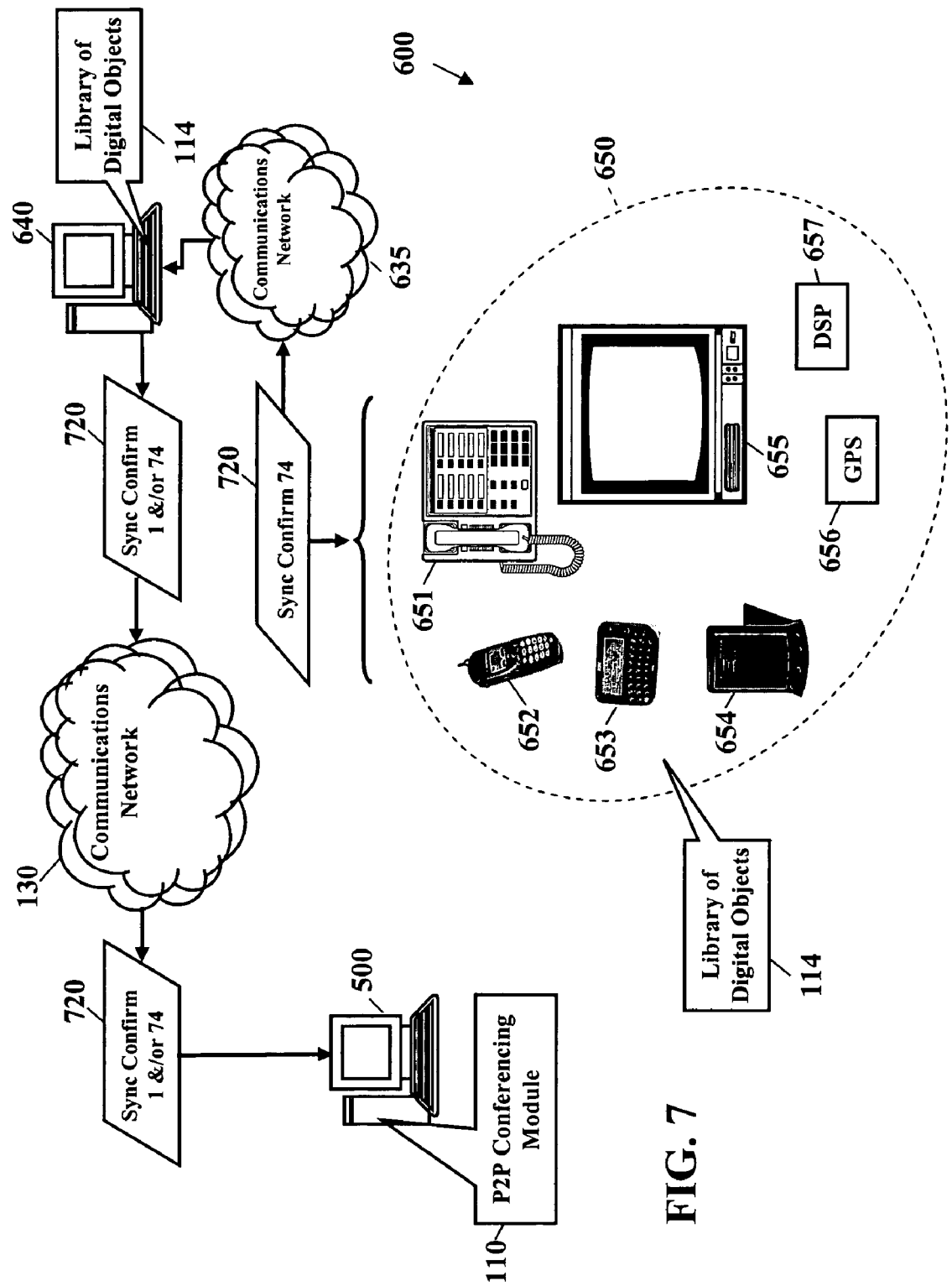

FIGS. 6 and 7 illustrate a peer to peer network 600 that includes the personal computer 500 hosting a peer to peer conference over communications network 130 with an upstream participant communications device 640 in communication over a communications network 635 with one or more alternate downstream communications devices 650 that operate with this invention. FIGS. 6 and 7 illustrate one or more alternate downstream participant communications device 650 that may include an Internet Protocol (IP) phone 651, a cellular/satellite phone 652, a pager 653, a personal digital assistant (PDA) 654, a Global Positioning System (GPS) device 656, an interactive television 657, or any computer and/or communications device utilizing the digital signal processor (DSP) 658. The alternate downstream participant communications device 650 may also include addressable watches, radios, vehicle electronics, clocks, printers, gateways, and other apparatuses and systems. The upstream participant communications device 640 communicates with alternate downstream participant communications device 650 via the communications network 635. The communications network 635 may include a telecommunications network (e.g., Public Switched Telephone Network (PSTN), Mobile Switching Telephone Office (MSTO), and others), a data network (e.g., an Internet (sometimes alternatively known as the "World Wide Web"), an intranet, a local-area network (LAN), and/or a wide-area network (WAN)), and/or a satellite network that establishes the communications path(s) among the P2P participants.

FIGS. 6 and 7 further illustrate the communications paths of a synchronization command 620 from the personal computer 500 to synchronize presentation of the object from the library 114 and of a synchronization confirmation 720 from the peer to peer network 600 to acknowledge a successful presentation of the synchronized object. Similar to the embodiments described above, as the computer system 500 switches from one synchronized object to another synchronized object in the library 114 of digital objects, each synchronization command 620 is communicated within the peer to peer network 600 to instruct the upstream participant communications device 640 and the downstream participant communications device(s) 650 to "follow along" and synchronize with the personal computer 650. After the downstream participant communications device 650 successfully presents the synchronized object from the library 114, then that downstream participant communications device 650 communicates the synchronization confirmation 720 up the peer to peer network 600 of P2P participant communications devices so that the upstream participant communications device 640 may then communicate the synchronization confirmation 720 back to the computer system 500.

Figure 8:
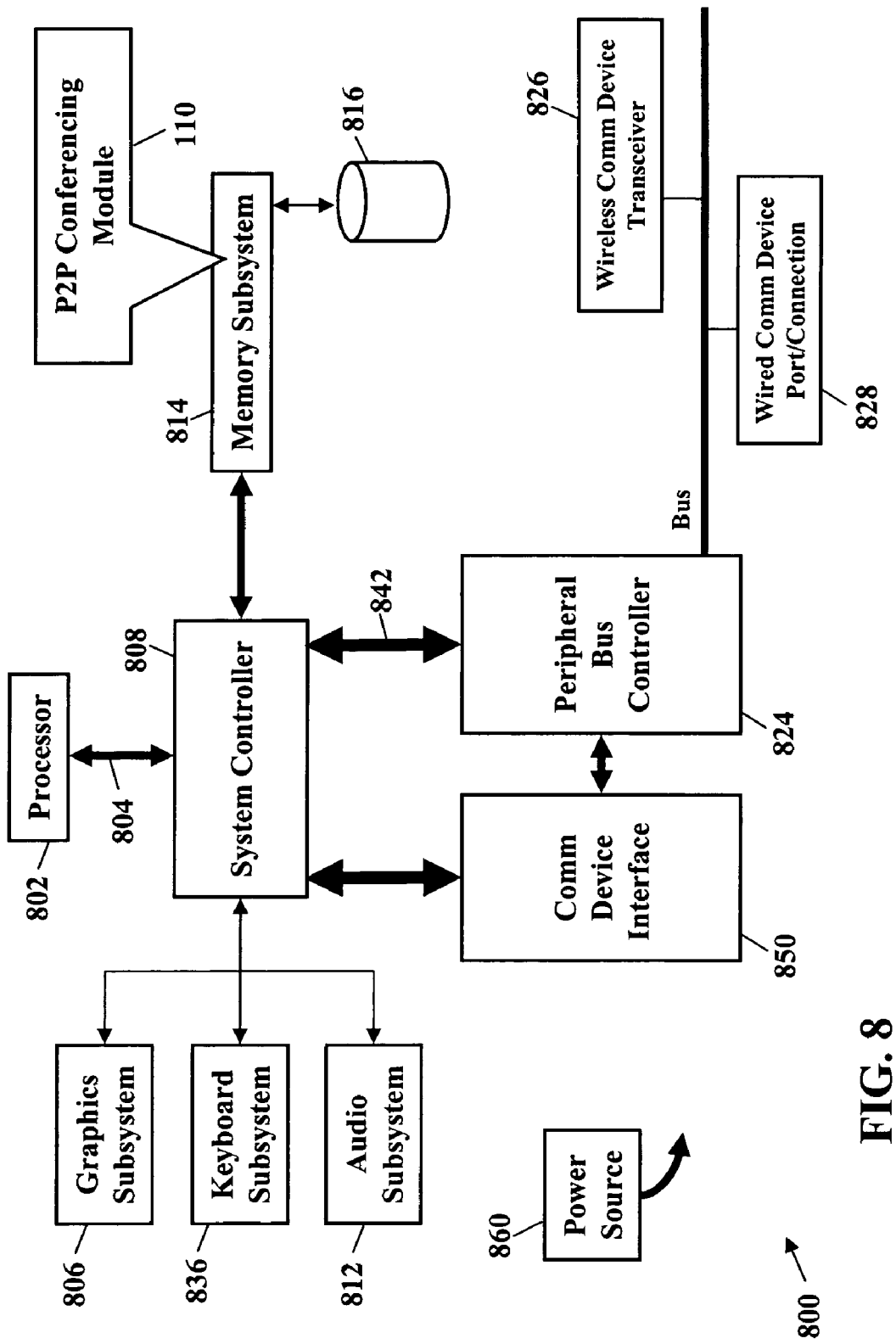
FIG. 8 illustrates another block diagram of an operating system according to some of the exemplary embodiments of this invention.

FIG. 8 illustrates another block diagram showing the P2P Conferencing Module 110 residing in an alternate voice/data communications device 800. As FIG. 1 shows, the P2P Conferencing Module 110 operates within a system memory device. The P2P Conferencing Module 110, for example, is shown residing in a memory subsystem 814. The P2P Conferencing Module 110, however, could also reside in flash memory 826 or a peripheral storage device 816. The voice/data communications device 800 also has one or more central processors 802 executing an operating system. The operating system, as is well known in the art, has a set of instructions that control the internal functions of the voice/data communications device 800. A communications interface 804 communicates signals, such as data signals, control signals, and address signals, between the central processor 802 and a system controller 808 (typically called a "Northbridge"). According to some of the embodiments of this invention, these signals include synchronization command 920 of FIG. 9 and synchronization confirmation 1020 of FIG. 10. Additionally, the communications interface 804 has a means to communicate a communications signal between the voice/data communications device 800 and a communications network (such as 130 of FIGS. 1-10).

The system controller 808 provides a bridging function between the one or more central processors 802, a graphics subsystem 806, a keyboard subsystem 836, an audio subsystem 812, the memory subsystem 814, a PCI (Peripheral Controller Interface) bus 842, and a Communications ("Comm") Device Interface 850. The PCI bus 842 is controlled by a Peripheral Bus Controller 824. The Peripheral Bus Controller 824 (typically called a "Southbridge") is an integrated circuit that serves as an input/output hub for various peripheral ports and/or transceivers. These peripheral ports allow the voice/data communications device 800 to communicate with a variety of devices through networking ports (such as SCSI or Ethernet) and/or transceivers that include Wireless Communications ("Comm") Device Transceiver 826 (for communication of any frequency signal in the electromagnetic spectrum, such as, for example, Wireless 802.11 and Infrared) and Wired Communications ("Comm") Device Port/Connection 828 (such as modem V90+ and compact flash slots). These peripheral ports could also include other networking ports, such as, a serial port (not shown) and/or a parallel port (not shown). The Comm Device Interface 850 allows the voice/data communications device 800 to monitor, detect, receive, and decode incoming (and outgoing) communications signals to the communications device(s) connected to the Wireless Comm Device Transceiver 826 and/or the Wired Comm Device Port/Connection 828. Further, the Comm Device Interface 850 may transmit the communications signal to the Wireless Comm Device Transceiver 826 and/or the Wired Comm Device Port/Connection 828. Still further, the voice/data communications device 800 may include a power source 860, such as a rechargeable battery to provide power and allow the voice/data communications device 800 to be portable. Additionally, those of ordinary skill in the art understand that the program, processes, methods, and systems described in this patent are not limited to any particular computer system or computer hardware.

Figure 9:
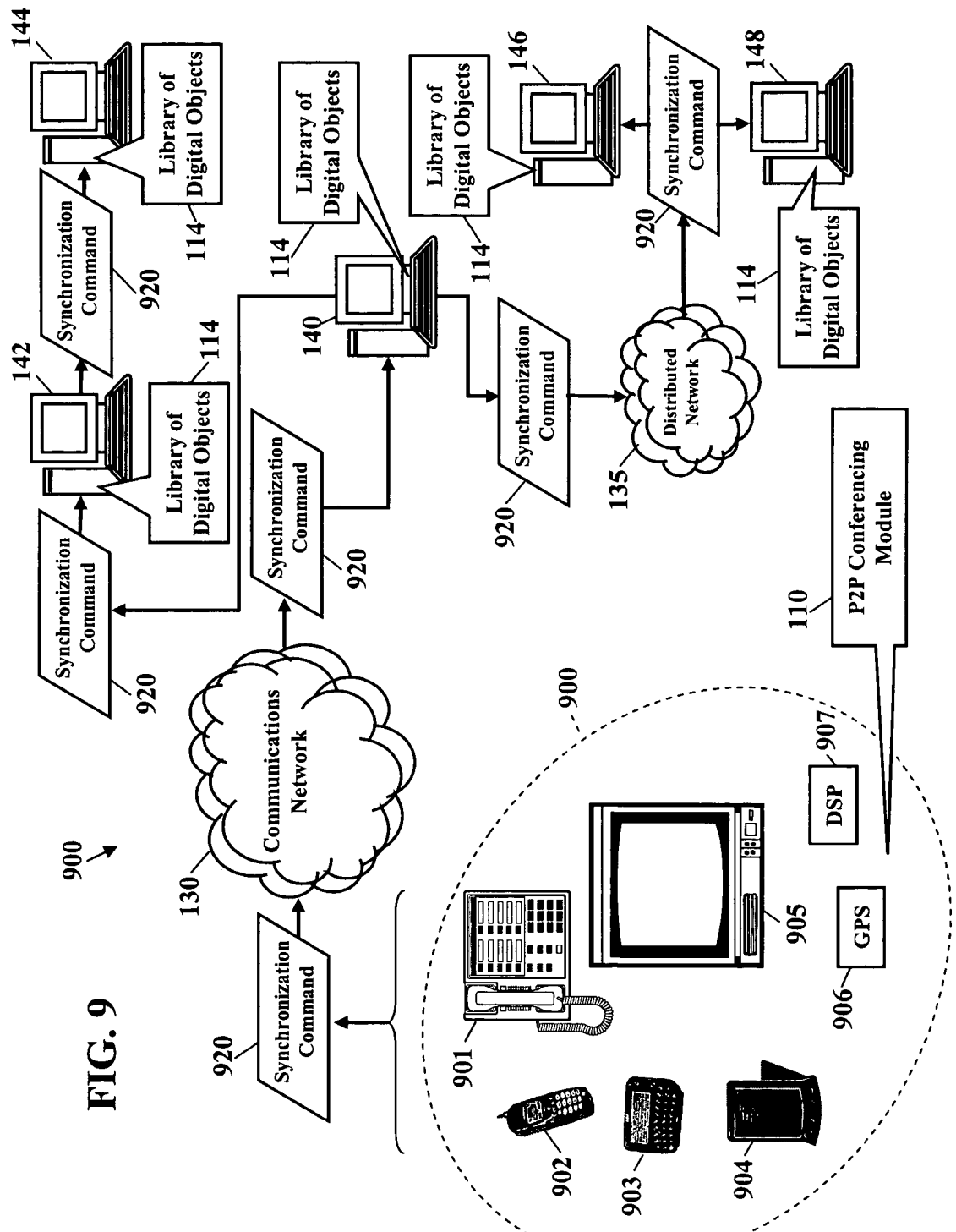
FIGS. 9-10 are schematics depicting still a further peer to peer network for conferencing, synchronization, and management according to some of the exemplary embodiments of this invention.
Figure 10:
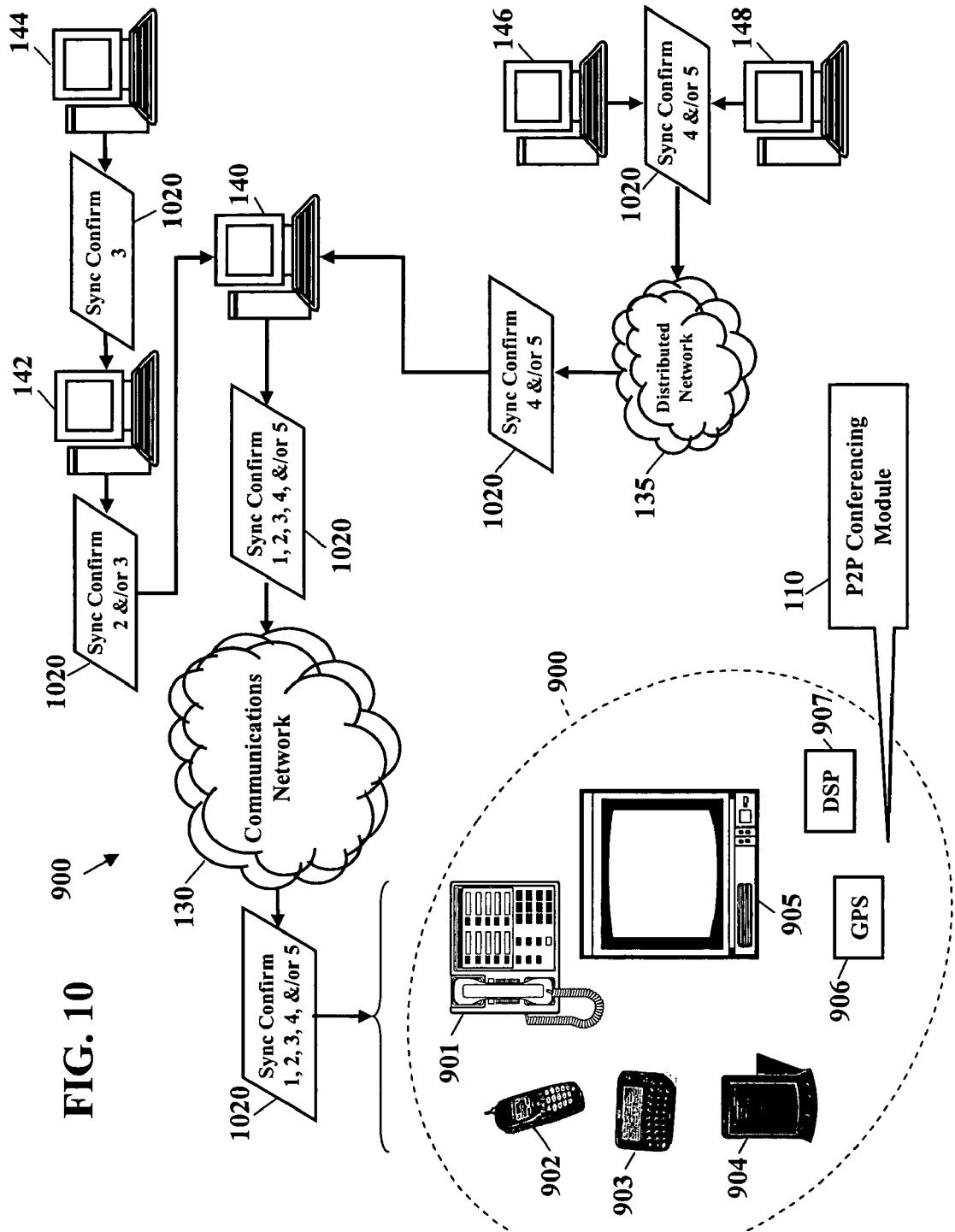

FIGS. 9 and 10 illustrate a peer to peer network 900 that includes one or more alternate voice/data communications devices 800 hosting a peer to peer conference over communications network 130 with the upstream participant communications device 140 in communication with downstream participant communications devices 142, 144, 146, and 148 that operate with this invention. FIGS. 9 and 10 illustrate one or more alternate voice/data communications device 800 that may include an Internet Protocol (IP) phone 901, a cellular/satellite phone 902, a pager 903, a personal digital assistant (PDA) 904, an interactive television 905, a Global Positioning System (GPS) device 906, or any computer and/or communications device utilizing the digital signal processor (DSP) 907. The alternate voice/data communications device 800 may also include addressable watches, radios, vehicle electronics, clocks, printers, gateways, and other apparatuses and systems. The alternate voice/data communications device 800 communicates with upstream participant communications device 140 via the communications network 130 which may include a telecommunications network (e.g., Public Switched Telephone Network (PSTN), Mobile Switching Telephone Office (MSTO), and others), a data network (e.g., an Internet (sometimes alternatively known as the "World Wide Web"), an intranet, a local-area network (LAN), and/or a wide-area network (WAN)), and/or a satellite network that establishes the communications path(s) among the alternate voice/data communications device 800 and the upstream participant communications device 140.

FIGS. 9 and 10 further illustrate the communications paths of a synchronization command 920 from the voice/data communications device 800 to synchronize presentation of the object from the library 114 and of a synchronization confirmation 1020 from the peer to peer network 900 to acknowledge a successful presentation of the synchronized object. Similar to the embodiments described above, as the alternate voice/data communications device 800 switches from one synchronized object to another synchronized object in the library 114 of digital objects, each synchronization command 920 is communicated within the peer to peer network 900 to instruct the upstream participant communications device 140 and the downstream participant communications device(s) 142, 144, 146, and 148 to "follow along" and synchronize with the alternate voice/data communications device 800. After the downstream participant communications device(s) 142, 144, 146, and/or 148 successfully presents the synchronized object from the library 114, then that downstream participant communications device 142, 144, 146, and/or 148 communicates the synchronization confirmation 1020 up the peer to peer network 900 of P2P participant communications devices so that the upstream participant communications device 140 may then communicate the synchronization confirmation 1020 back to the alternate voice/data communications device 800.

Figure 11:
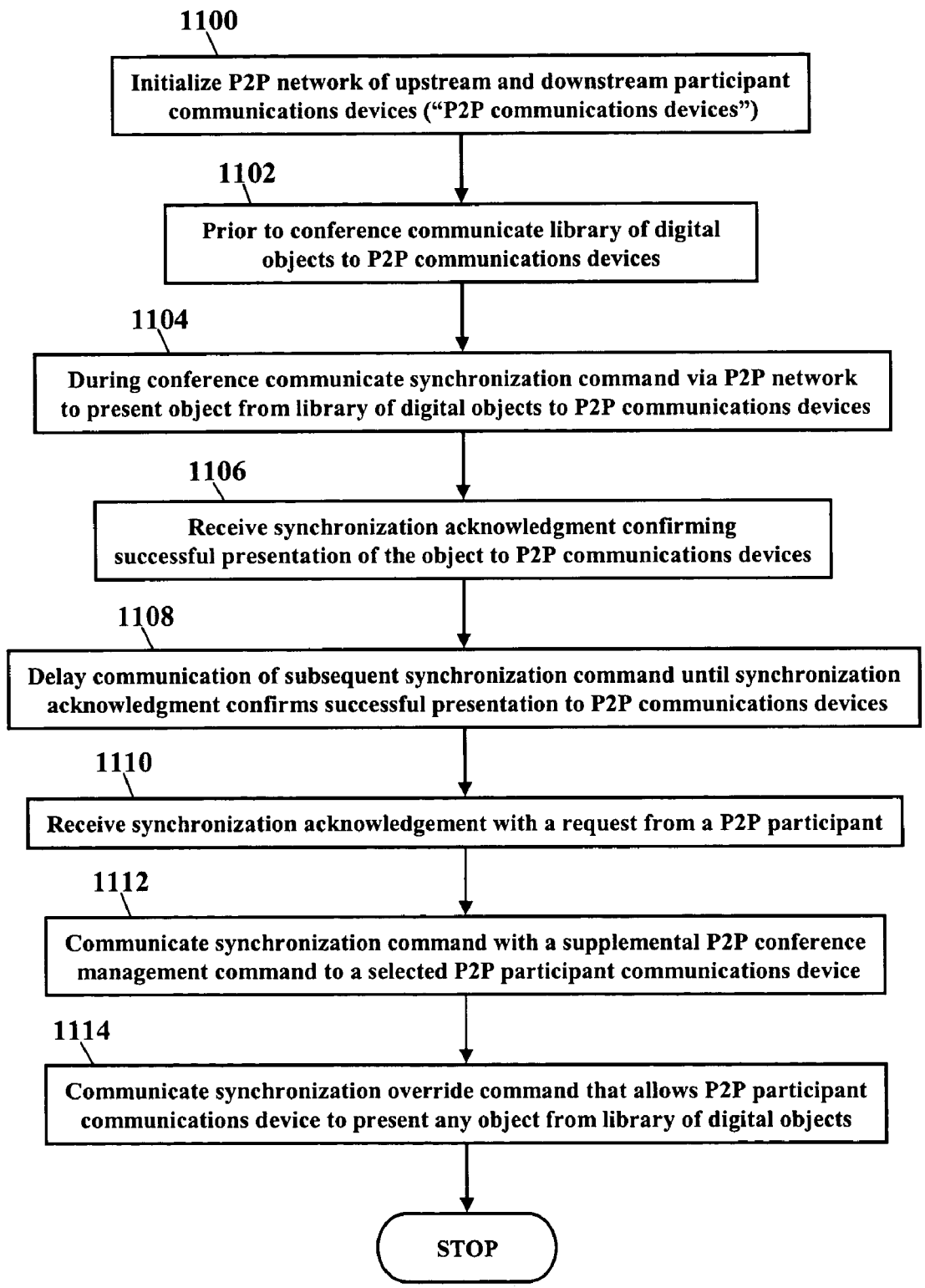
FIG. 11 is a flowchart illustrating a peer to peer conferencing, synchronization, and management method according to some of the exemplary embodiments of this invention.

FIG. 11 is a flowchart illustrating an exemplary method of conducting a conference amongst peer to peer participants. Prior to the conference, a list of P2P communications devices is accessed (Block 1100) and a library of digital objects is communicated to the P2P participant communications devices (Block 1102). Then, during the conference, a synchronization command is communicated from a host communications device to the P2P participant communications devices (referred to also as the "P2P network") (Block 1104). The synchronization command commands the P2P participant communications device to present an object from the library of digital objects and to communicate the synchronization command within the P2P network. A synchronization confirmation is then received from the P2P participant communications devices (Block 1106). The synchronization confirmation confirms a successful presentation of the object within the P2P network as described in further detail in some of the above embodiments. The method may also delay communication of a subsequent synchronization command until the synchronization confirmation is received from all of the P2P participant communications devices (Block 1108). The method may also include the host receiving a synchronization acknowledgement with a request from a particular P2P participant (Block 1110). For example, the synchronization acknowledgement may include a request to ignore receipt of the synchronization confirmation from a selected P2P participant communications device. When receipt of the synchronization confirmation is ignored, the selected P2P participant communications device is allowed to present any object from the library of digital objects. A synchronization command with supplemental commands and/or instructions (e.g., command that enables a selected P2P participant to email the library to a non participant) may also be communicated to a selected P2P participant communications device (Block 1112). And, finally, the method may include the host communicating a synchronization override command that allows a selected P2P participant communications device to present any object from the library of digital objects (Block 1114).

The P2P Conferencing Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the P2P Conferencing Module to be easily disseminated. A computer program product for conducting a conference amongst peer to peer participants includes the P2P Conferencing Module stored on the computer-readable medium. The P2P Conferencing Module initializes the peer to peer conference amongst at least one upstream participant communications device and at least one downstream participant communications device. Prior to the peer to peer conference, the P2P Conferencing Module communicates a library of digital objects to the upstream participant communications device(s) and/or to the downstream participant communications devices. Alternatively, the upstream participant communications devices may communicate the library to the downstream participant communications devices. During the conference, the P2P Conferencing Module communicates a synchronization command to the upstream participant communications device, and the upstream participant communications device communicates the synchronization command to the downstream participant communications device. The synchronization command provides instructions to present an object from the library of digital objects to each of the P2P participant communications devices. Furthermore, the P2P participant communications devices may communicate a synchronization acknowledgment back to the P2P Conferencing Module. The synchronization confirmation acknowledges a successful presentation (or, alternatively, a failed presentation or alternate information) of the synchronized object to the upstream participant communications device and to at least one of the downstream participant communications devices.

The P2P Conferencing Module may also be physically embodied on or in any addressable (e.g., HTTP, I.E.E.E. 802.11, Wireless Application Protocol (WAP)) wireline and/or wireless communications device capable of presenting an IP address. Examples could include a computer, a wireless personal digital assistant (PDA), an Internet Protocol mobile phone, or a wireless pager.

While this invention has been described with respect to various features, aspects, and embodiments, those skilled and unskilled in the art will recognize the invention is not so limited. Other variations, modifications, and alternative embodiments may be made without departing from the spirit and scope of this invention.

What is claimed is:

1. A method of conducting a conference amongst peer to peer participants, comprising:
   initializing the conference amongst at least one upstream participant communications device and at least one downstream participant communications device;
   prior to the conference,
      communicating a library of digital objects to the upstream participant communications device,
      communicating the library of digital objects from the upstream participant communications device to the downstream participant communications device;
   during the conference,
      communicating a synchronization command from a host communications device to the upstream participant communications device, wherein the synchronization command further instructs the upstream participant communications device to present the object from the library of digital objects,
      communicating the synchronization command from the upstream participant communications device to the downstream participant communications device, wherein the synchronization command further instructs the downstream participant communications device to present the object from the library of digital objects; and
   receiving a synchronization acknowledgment from the upstream participant communications device, the synchronization acknowledgment identifying the upstream participant communications device and the downstream participant communications device, the synchronization acknowledgement further confirming a successful presentation of the object to the upstream participant communications device and to the downstream participant communications device.

2. The method of claim 1, further comprising:
   prior to the conference,
      communicating the library of digital objects from the downstream participant communications device to another downstream participant communications device; and
   during the conference,
      communicating the synchronization command from the downstream participant communications device to the other downstream participant communications device, the synchronization command further instructing the other downstream participant communications device to present an object from the library of digital objects.

3. The method of claim 1, further comprising delaying communication of a subsequent synchronization command until the synchronization acknowledgment is received from the upstream participant communications device.

4. The method of claim 1, wherein the synchronization acknowledgment further provides at least one of (i) a request to exit the conference, (ii) a request to delay presentment of the conference, (iii) a request to access to a non-synchronized digital object, (iv) a request for authority to distribute the object to a non-participant of the conference, (v) a request for authority to modify the object, (vi) a request to terminate further communication of the synchronization acknowledgement.

5. The method of claim 1, wherein the synchronization command further provides at least one of (i) a command to exit the conference, (ii) a command to delay presentment of the conference, (iii) a synchronization override command to access to any object from the library of digital objects, (iv) authority to distribute the object to the non-participant, (v) authority to modify the object, (vi) a command to terminate further communication of the synchronization acknowledgement.

6. The method of claim 1, further comprising:
   ignoring receipt of the synchronization acknowledgment from a particular participant communications device, thus allowing the particular participant communications device to present any object from the library of digital objects.

7. The method of claim 1, wherein initializing the conference amongst the upstream participant communications device and the downstream participant communications device comprises:
   accessing a list of upstream participant communications devices and downstream participant communications devices, and
   communicating the list of upstream participants communications devices and downstream participant communications devices.

8. The method of claim 7, wherein initializing the conference amongst the upstream participant communications device and the downstream participant communications device further comprises:
   analyzing transmission rates between at least two participant communications devices and between the host communications device and each of the at least two participant communications devices to determine the upstream participant communications device and the downstream participant communications device.

9. The method of claim 7, wherein initializing the conference amongst the upstream participant communications device and the downstream participant communications device further comprises:
   analyzing a cost factor between at least two participant communications devices and another cost factor between the host communications device and each of the at least two participant communications devices to determine the upstream participant communications device and the downstream participant communications device,
   analyzing a reliability factor between at least two participant communications devices and another reliability factor between the host communications device and each of the at least two participant communications devices to determine the upstream participant communications device and the downstream participant communications device, and analyzing a security factor between at least two participant communications devices and another security factor between the host communications device and each of the at least two participant communications devices to determine the upstream participant communications device and the downstream participant communications device.

10. The method of claim 1, further comprising:

prior to the conference, verifying the upstream participant communications device and the downstream participant communications device have local access to the library of digital objects.

11. A system, comprising:

a Peer to Peer Conferencing Module stored in a memory device, and a processor communicating with the memory device, the Peer to Peer Conferencing Module initializing the conference amongst at least one upstream participant communications device and at least one downstream participant communications device, communicating a library of digital objects prior to a conference, the library of digital objects communicated to the upstream participant communications device and communicated from the upstream participant communications device to the downstream participant communications device, communicating a synchronization command during the conference, the synchronization command communicated to the upstream participant communications device and communicated from the upstream participant communications device to the downstream participant communications device, the synchronization command commanding the upstream participant communications device and the downstream participant communications device to present an object from the library of digital objects, and receiving a synchronization acknowledgment from the upstream participant communications device, the synchronization acknowledgment identifying the upstream participant communications device and the downstream participant communications device and confirming a successful presentation of the object to the upstream participant communications device and to the downstream participant communications device.

12. The system of claim 11, further comprising:

a communications network connecting the Peer to Peer Conferencing Module with the upstream participant communications device, the communications network comprising at least one of a telecommunications network, a data communications network, and a satellite communications network.

13. The system of claim 12, the data communications network comprising at least one of an Internet, Intranet, and Extranet.

14. The system of claim 11, the upstream participant communications device comprising at least one of a computer, a voice-over internet protocol phone, a digital music device, a digital recording device, a personal digital assistant, an interactive television, a global positioning system, and a digital signal processor.

15. The system of claim 11, the downstream participant communications device comprising at least one of a computer, a voice-over internet protocol phone, a digital music device, a digital recording device, a personal digital assistant, an interactive television, a global positioning system, and a digital signal processor.

16. The system of claim 11, further comprising:

a peer to peer communications network connecting the upstream participant communications device with the downstream participant communications device, the peer to peer communications network comprising at least one of a direct data communications connection and a distributed data communications connection via at least one of a telecommunications network, a data communications network, and a satellite communications network.

17. The system of claim 11, the Peer to Peer Conferencing Module further communicating the library of digital objects prior to the conference, the library of digital objects communicated from the downstream participant communications device to another downstream participant communications device, and during the conference, and further communicating the synchronization command during the conference, the synchronization command communicated from the downstream participant communications device to the other downstream participant communications device, the synchronization command further instructing the other downstream participant communications device to present the object from the library of digital objects.

18. The system of claim 17, the peer to peer communications network further connecting the downstream participant communications device with the other downstream participant communications device.

19. A computer program product, comprising:

a computer-readable medium; and a Peer to Peer Conferencing Module stored on the computer-readable medium, the Peer to Peer Conferencing Module initializing the conference amongst at least one upstream participant communications device and at least one downstream participant communications device, communicating a library of digital objects prior to a conference, the library of digital objects communicated to the upstream participant communications device and communicated from the upstream participant communications device to the downstream participant communications device, communicating a synchronization command during the conference, the synchronization command communicated to the upstream participant communications device and communicated from the upstream participant communications device to the downstream participant communications device, the synchronization command commanding the upstream participant communications device and the downstream participant communications device to present an object from the library of digital objects, and receiving a synchronization acknowledgment from the upstream participant communications device, the synchronization acknowledgment identifying the upstream participant communications device and the downstream participant communications device and confirming a successful presentation of the object to the upstream participant communications device and to the downstream participant communications device.

20. The computer program product of claim 19, the Peer to Peer Conferencing Module further communicating the library of digital objects prior to the conference, the library of digital objects communicated from the downstream participant communications device to another downstream participant communications device, and during the conference, and further communicating the synchronization command during the conference, the synchronization command communicated from the downstream participant communications device to the other downstream participant communications device, the synchronization command further instructing the other downstream participant communications device to present the object from the library of digital objects.

* * * * *